United States Patent
Ying et al.

(10) Patent No.: US 7,005,759 B2
(45) Date of Patent: Feb. 28, 2006

(54) INTEGRATED CONVERTER HAVING THREE-PHASE POWER FACTOR CORRECTION

(75) Inventors: Jianping Ying, Taoyuan Shien (TW); Jingtao Tan, Taoyuan Shien (TW); Lin Chen, Taoyuan Shien (TW); Raymond Lee, Taoyuan Shien (TW)

(73) Assignee: Delta Electronics, Inc., Taoyuan Shien (TW)

( * ) Notice: Subject to any disclaimer, the term of this patent is extended or adjusted under 35 U.S.C. 154(b) by 33 days.

(21) Appl. No.: 10/778,622

(22) Filed: Feb. 12, 2004

(65) Prior Publication Data

US 2004/0160789 A1    Aug. 19, 2004

(30) Foreign Application Priority Data

Feb. 18, 2003 (TW) .............................. 92103347 A

(51) Int. Cl.
*H02J 7/00* (2006.01)
(52) U.S. Cl. .......................... 307/64; 307/66; 307/110
(58) Field of Classification Search .................. 307/64, 307/66, 65, 110
See application file for complete search history.

(56) References Cited

U.S. PATENT DOCUMENTS

| | | | | |
|---|---|---|---|---|
| 6,115,274 A | * | 9/2000 | Mao | 363/89 |
| 6,239,995 B1 | * | 5/2001 | Weng et al. | 363/89 |
| 6,583,644 B1 | * | 6/2003 | Shin | 326/26 |
| 6,806,692 B1 | * | 10/2004 | Lee | 323/277 |

* cited by examiner

*Primary Examiner*—Bao Q. Vu
(74) *Attorney, Agent, or Firm*—Haverstock & Owens LLP

(57) ABSTRACT

An integrated converter is provided. The integrated converter includes an AC/DC converter electrically connected to a three-phase power supply for converting an alternating current into a first direct current and achieving the object of the power factor correction; and a DC/DC converter electrically connected to the AC/DC converter for converting the first direct current into a second direct current, wherein while the AC power supply is electricity-drop, the controlling switch is turned on by the integrated converter and the integrated converter is switched from an AC/DC working mode to a DC/DC working mode, and while the AC power supply is restored to normal, the controlling switch is turned off by the integrated converter and the integrated converter is switched from said DC/DC working mode to the AC/DC working mode.

11 Claims, 15 Drawing Sheets

US 7,005,759 B2

INTEGRATED CONVERTER HAVING THREE-PHASE POWER FACTOR CORRECTION

FIELD OF THE INVENTION

This invention relates to a power converter, and more particularly to a power converter device with semiconductor switching device such as MOSFET (Metal-Oxide-Semiconductor Field Effect Transistor), IGBT (Insulated Gate Bipolar Transistor), and etc.

BACKGROUND OF THE INVENTION

Please refer to FIG. 1, which shows an on-line uninterrupted power supply (UPS) system for three-phase input according to the prior art. The three-phase AC (Alternating current)/DC (Direct current) converter 101 and DC/DC converter 102 together serve as the front input of the inverter 103. While the three-phase power supply 106 is normal, the controlling switch 104 is cut off so that the DC/DC converter 102 does not work and the three-phase AC/DC converter 101 provides direct power for the inverter 103. On the contrary, while the three-phase power supply 106 is abnormal, the controlling switch 104 is turn on so that the DC/DC converter 102 works and the battery 105 with lower energy provides a direct power for the inverter 103. Moreover, the numeral 107 represents the output path of the voltage or current in the on-line UPS system for three-phase input under the normal conditions; the numeral 108 represents the bypass output path of the voltage or current in the on-line UPS system for three-phase output; the numeral 109 represents the output end of the UPS system.

In FIG. 1, the front power supply of the inverter 103 employs the two converter devices of AC/DC and DC/DC. Thus, it has higher cost and lower power density. Please refer to FIG. 2, which shows a topological circuit diagram of an uninterrupted power supply system for three-phase input and single-phase output according to the prior art. In this drawing, $u_a$, $u_b$, $u_c$ respectively represent three-phase input power supply; N represents neutral line; $i_a$, $i_b$, $i_c$ respectively represent three-phase input current. Meanwhile, the AC/DC and DC/DC converter 201 is mainly composed of rectifying circuits including $D_1$~$D_6$ rectifying diodes, controlling switch $S_0$, battery 202, inductors $L_1$, $L_2$, switching devices $S_1$, $S_2$, fast recovery diodes $D_7$, $D_8$, input voltages $V_{01}$, $V_{02}$, and capacitors $C_1$, $C_2$. Inverter 203 is mainly composed of switching devices $S_3$, $S_4$. $V_o$ represents output voltage of the UPS system for three-phase input and single-phase output.

In the present description, the described switching device can be MOSFET, IGBT, and etc. In FIG. 2, the circuit employs a half-bridge inverter served as output, and employs a power converter integrating AC/DC and DC/DC converting function for the front input of the inverter. While the power supply is normal, the power converter device turns off the controlling switch $S_0$ and achieves the three-phase AC/DC power conversion. However, while the power supply fails, the controlling switch $S_0$ will be turned on so as to achieve the three-phase DC/DC power conversion. This kind of integrated converter can respectively achieve the AC/DC and DC/DC transformation via the same power elements under different conditions. Therefore the utilization rate of the power elements is increased and the cost of the UPS reduced. However, in the integrated converter there is an obvious defect existed that the AC/DC converter almost lacks of the function of power factor correction. While the three-phase power supply is employed, the input current harmonics is quite high and the total harmonic distortion rate is about 30% so that it cannot meet the harmonic requirement of the input current of the electrical devices in different countries. Therefore, the above-mentioned integrated converter still bears great restriction in the application.

In order to overcome the drawbacks in the prior art, an integrated converter having three-phase power factor correction is provided. In the particular design, the integrated converter can achieve a lower input current harmonics to meet different requirements and have the features of high efficiency, high density, low cost, and etc.

SUMMARY OF THE INVENTION

It is an object of the present invention to provide an integrated converter applied to the front input of all kinds of alternating uninterrupted power supply, alternating urgent power supply, and etc. so as to achieve a low input current harmonics to meet all kinds of requirements and have the features of high efficiency, high density, low cost, and etc.

In accordance with an aspect of the present invention, an integrated converter includes a set of first inductors having an end electrically connected to an AC power supply; an AC/DC converting device electrically connected to the other end of the set of first inductors for converting an alternating current into a first direct current; a controlling switch electrically connected in series with an electric energy storage device and a second inductor; and a DC/DC converting device electrically connected to the AC/DC converting device for converting the first direct current into a second direct current, wherein while the AC power supply is abnormal, the controlling switch is turned on and the integrated converter is switched from an AC/DC working mode to a DC/DC working mode, and while the AC power supply is restored to normal, the controlling switch is turned off and the integrated converter is switched from the DC/DC working mode to the AC/DC working mode.

Preferably, the integrated converter further includes a filter electrically connected between the set of first inductors and the AC power supply.

Preferably, the abnormal state of the AC power supply is one of an electricity-drop state and a breakdown state.

Preferably, the AC power supply is a three-phase AC power supply.

Preferably, the AC/DC converting device is a bridge rectifier.

Preferably, the electric energy storage device is a battery.

Preferably, the integrated converter includes a DC/DC converter and an AC/DC converter.

Preferably, the DC/DC converter includes the DC/DC converting device. The DC/DC converting device includes an upper half-bridge circuit including a first switching device, a first diode, and a first capacitor; and a lower half-bridge circuit including a second switching device, a second diode, and a second capacitor, wherein the first switching device is electrically connected in series with the second switching device; the first capacitor is electrically connected in series with the second capacitor; a connection nod between the first switching device and the second switching device is connected to a connection nod between the first capacitor and the second capacitor and further connected to a neutral line of the AC power supply, and the upper half-bridge circuit and the lower half-bridge circuit are electrically connected in parallel to a serial circuit including the controlling switch, the electric energy storage device, and the second inductor for converting an electric energy of the electric energy storage device into said first direct current, and further converting the first direct current into said second direct current via the upper half-bridge circuit and the lower half-bridge circuit.

Preferably, the AC/DC converter includes the set of first inductors, the AC/DC converting device, and the DC/DC converting device.

Preferably, the integrated converter further includes a sample circuit, and the sample circuit includes an operational amplifier having a negative input end individually and electrically connected to a serial circuit including at least one set of a first resistor and a diode and a positive input end electrically connected to a ground, wherein an output end of the first resistor is electrically connected to the AC power supply for sampling a sine wave of the AC power supply; and a second resistor electrically connected between the negative input end and output end of the operational amplifier.

In accordance with another aspect of the present invention, an integrated converter includes a set of first inductors having an end electrically connected to an AC power supply; an AC/DC converting device electrically connected to the other end of the set of first inductors; a controlling switch electrically connected in series with an electric energy storage device and a second inductor; and a DC/DC converting device electrically connected to the AC/DC converting device, wherein while the AC power supply is abnormal, the controlling switch is turned on and the integrated converter is switched to a first working circuit including the electric energy storage device, the second inductor, and the DC/DC converting device for providing a first direct current output, and while the AC power supply is restored to normal, the controlling switch is turned off and the integrated converter is switched to a second working circuit including the set of first inductors, the AC/DC converting device, and the DC/DC converting device for providing a second direct current output.

The above objects and advantages of the present invention will become more readily apparent to those ordinarily skilled in the art after reviewing the following detailed descriptions and accompanying drawings, in which:

BRIEF DESCRIPTION OF THE DRAWINGS

FIGS. 4b, 4c are diagrams respectively showing a divided independent upper-half bridge circuit and a divided independent lower-half bridge circuit of the topological diagram of FIG. 4a;

DETAILED DESCRIPTION OF THE PREFERRED EMBODIMENT

The present invention will now be described more specifically with reference to the following embodiments. Please refer to FIG. 3, which is a diagram showing a power converter circuit according to a preferred embodiment of the present invention. While the three-phase AC input power supplies $u_a$, $u_b$, $u_c$ are normal, the controlling switch $S_0$ is turned off. The converter of FIG. 3 can be simplified to the AC/DC converter as shown in FIG. 4a. The controlling switch $S_0$ is a silicon-controlled rectifier. On the contrary, while the three-phase AC input power supplies $u_a$, $u_b$, $u_c$ fail, the controlling switch $S_0$ is turned on. The converter of FIG. 3 can be simplified to the DC/DC converter as shown in FIG. 5. Therefore, the power converter of the present invention integrates the functions of the AC/DC converter shown in FIG. 4a and the DC/DC converter shown in FIG. 5. Since the switching devices $S_1$ (the first switching device) and $S_2$ (the second switching device), and the fast recovery diodes $D_7$ (the first diode) and $D_8$ (the second diode) are jointly employed in both the AC/DC converter and the DC/DC converter, the power converter of the present invention has the advantages of low cost and high power density.

Please refer to FIG. 4a, the AC/DC converter includes the filter, inductors $L_a$, $L_b$, $L_c$, the rectifying circuit composed of rectifying diodes $D_1$~$D_6$, the switching devices $S_1$ (the first switching device) and $S_2$ (the second switching device), fast recovery diodes $D_7$ (the first diode) and $D_8$ (the second diode), the capacitors $C_1$ (the first capacitor) and $C_2$ (the second capacitor), and etc.

Figure 4A:
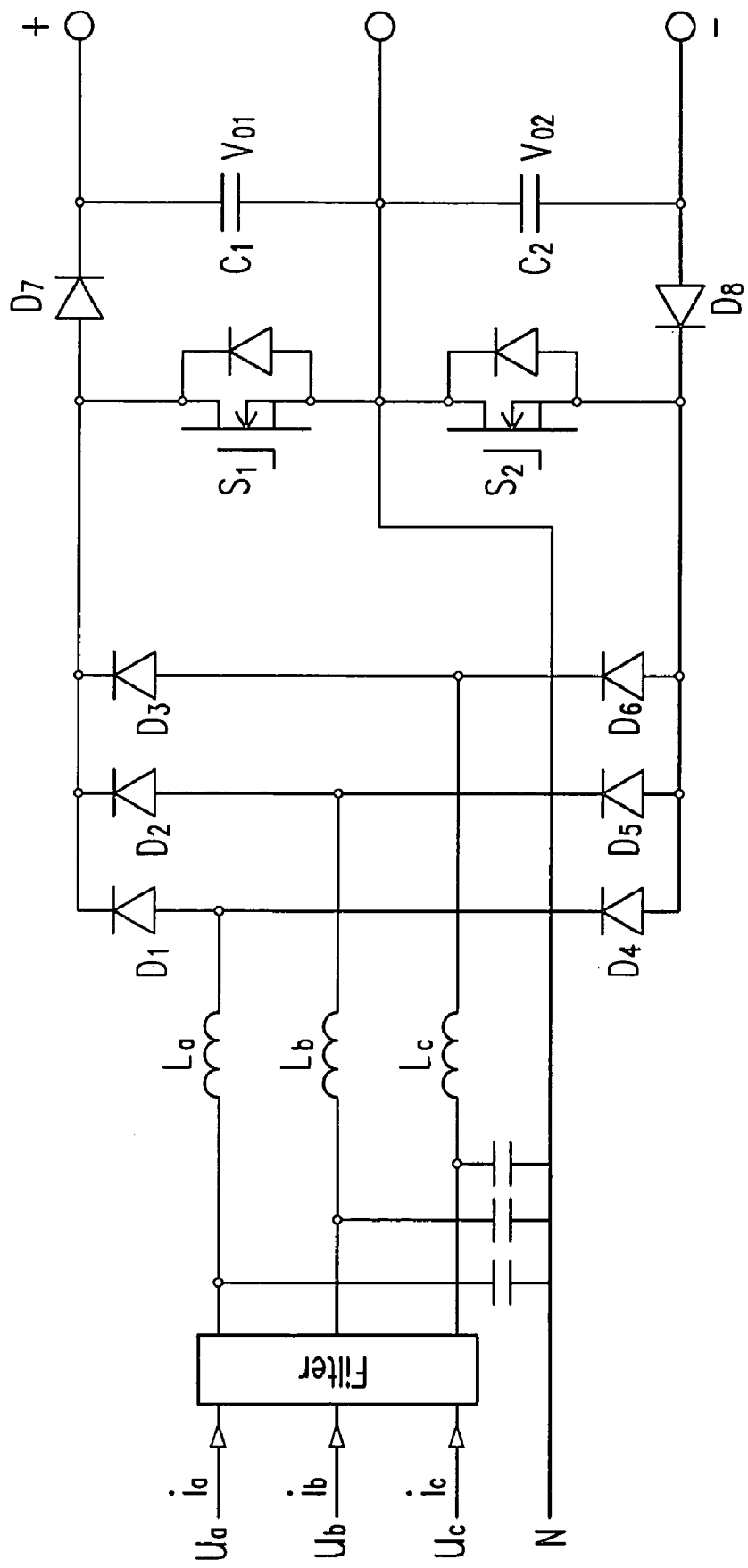
FIG. 4a is a diagram showing an AC/DC converter circuit simplified from the FIG. 3.
Figure 4B:
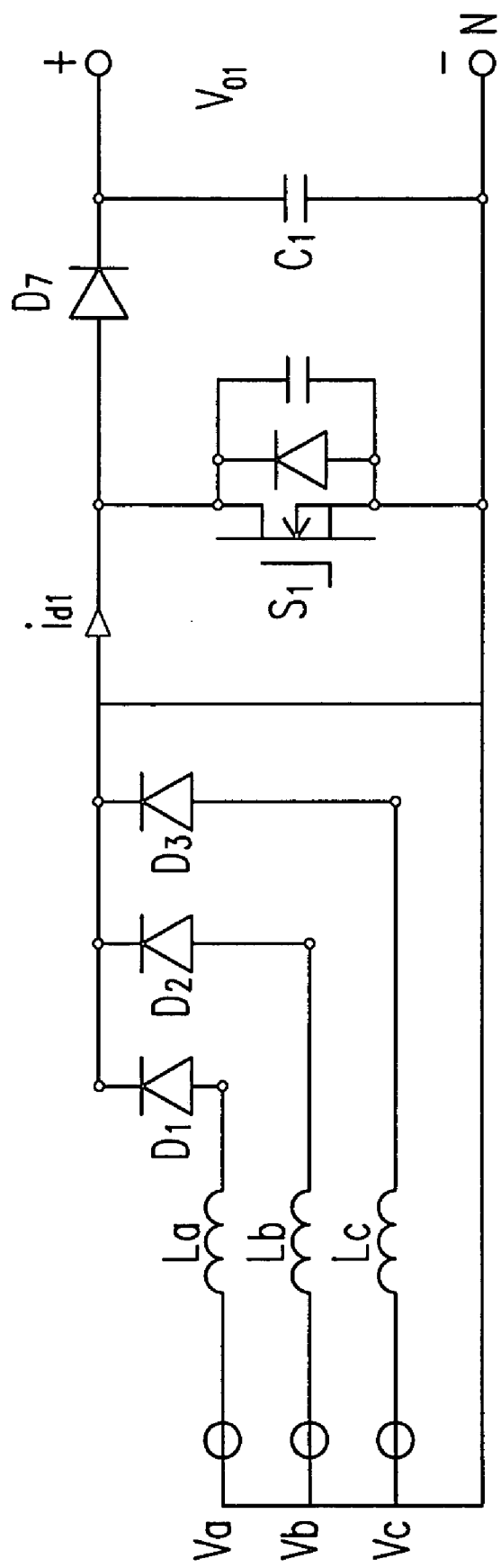
Figure 4C:
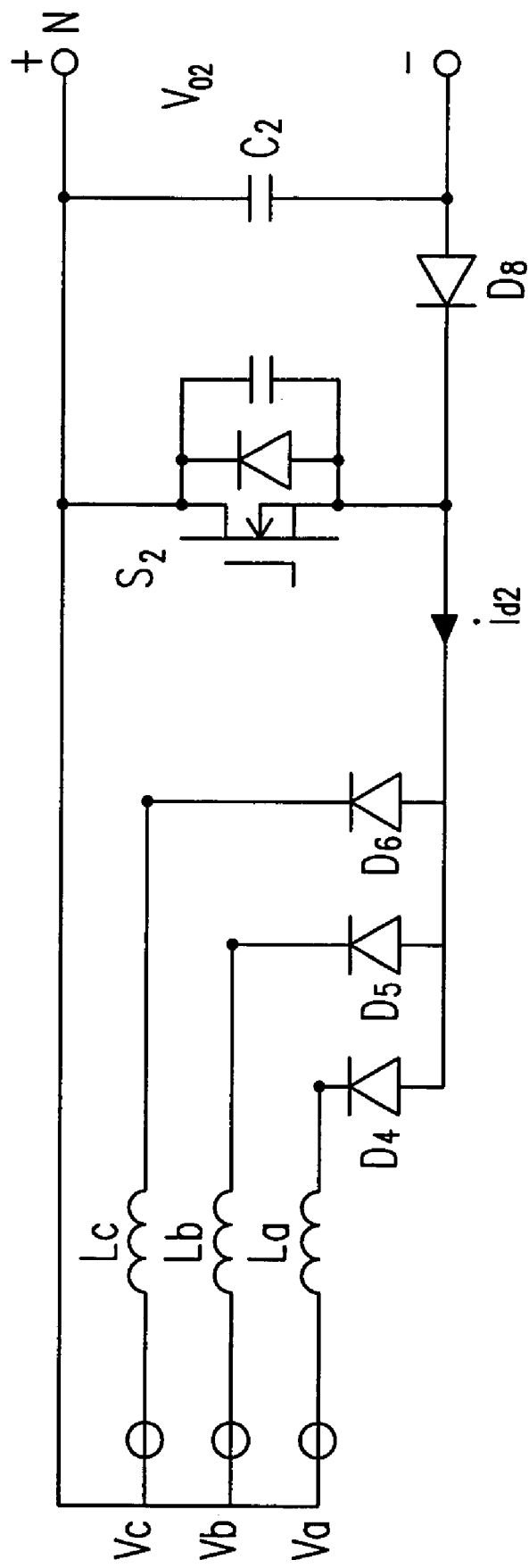
Figure 5:
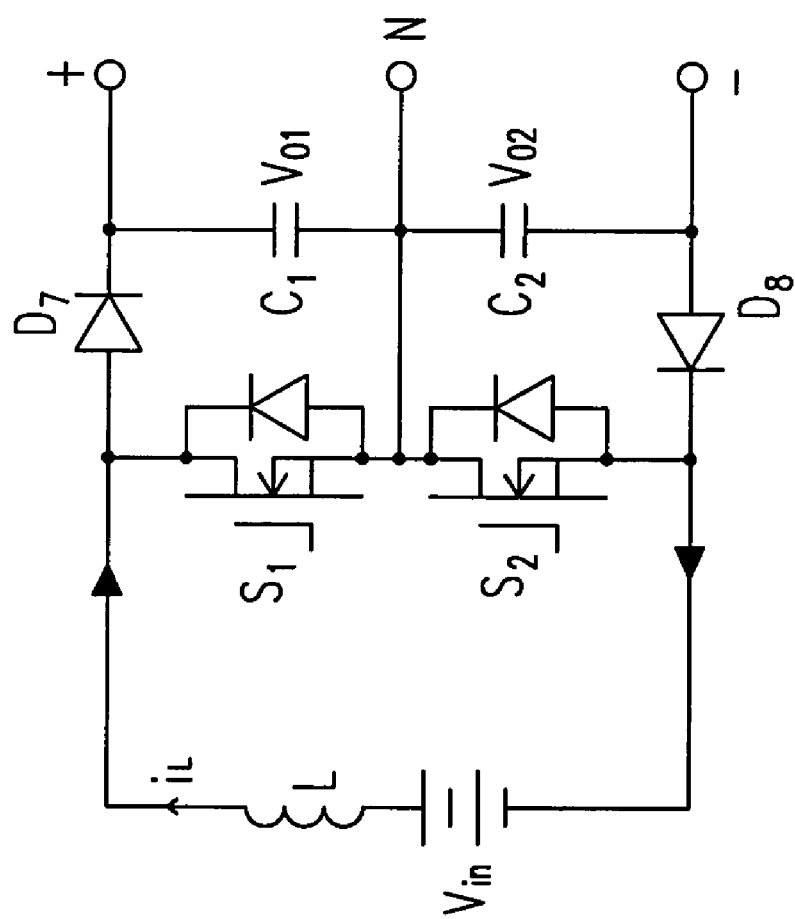
FIG. 5 is a diagram showing an DC/DC converter circuit simplified from the FIG. 3.

By introducing the neutral line N into the FIG. 4a, it can be divided into an independent upper-half bridge and an independent lower-half bridge respectively shown in FIG. 4b, and FIG. 4c.

The working mode of the circuit topological diagram shown in FIG. 4a is achieved via controlling the quantities of the inductors $L_a$, $L_b$, and $L_c$, and via different controlling strategies. Apparently, the circuit working pattern can be kept under the three working modes such as inductance-current continuity, inductance-current intermittence, and inductance-current critical continuity. In order to keep higher efficiency and lower input current harmonics while the converter is working, the integrated converter of the present invention employs the strategy that makes the inductors $L_a$, $L_b$, $L_c$, operate under the critical current continuity-working mode. In this controlling model, the conducting time of the switching devices $S_1$, $S_2$ is kept constant in every input voltage cycle.

Figure 6:
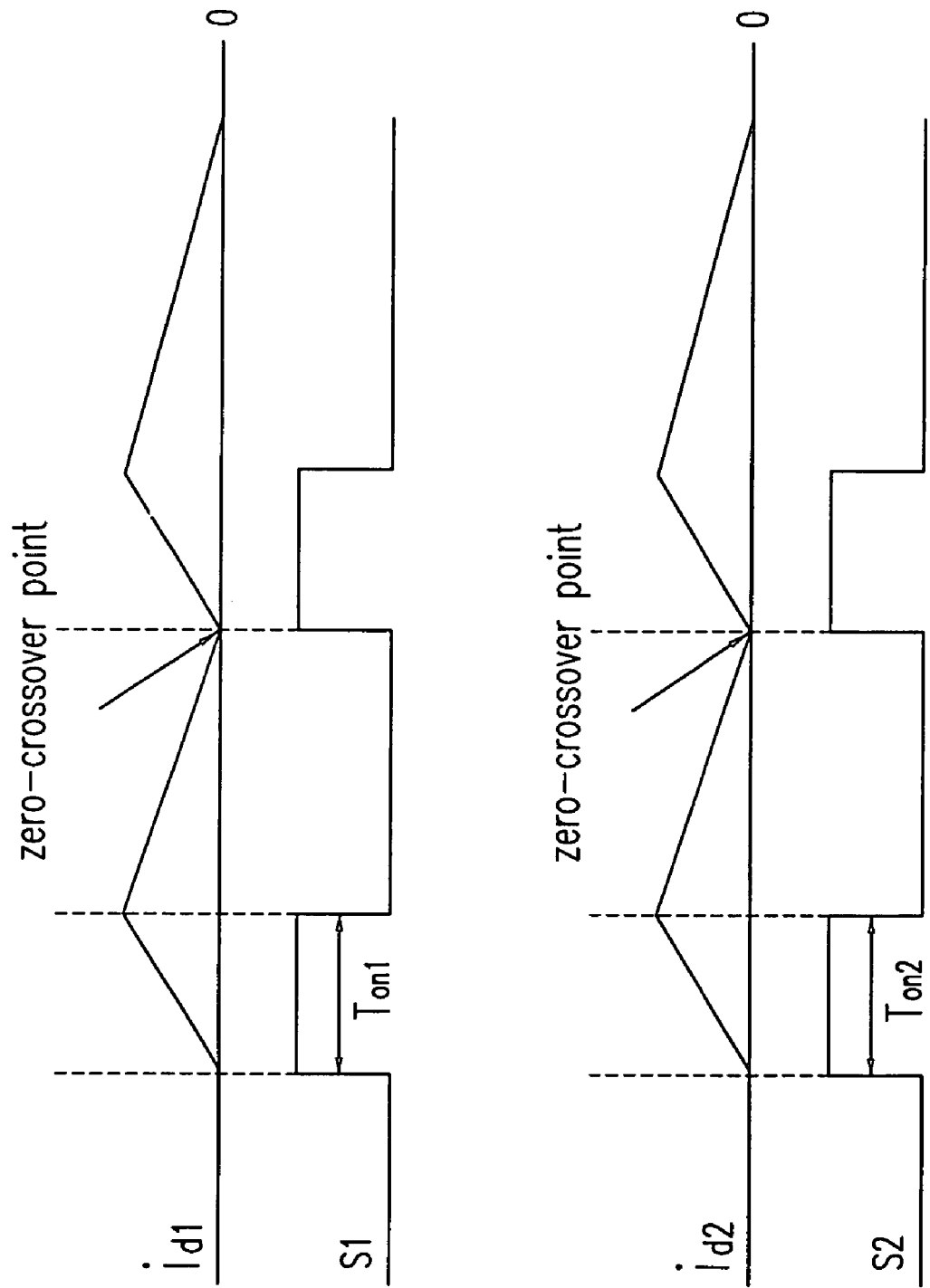
FIG. 6 is a schematic view showing the controlling strategies according to a preferred embodiment of the present invention.

Please refer to FIG. 6, which is a schematic view showing the controlling strategies according to a preferred embodiment of the present invention. The line current $i_{d1}$ of the upper-half bridge is employed to control the switching device $S_1$ being conducted and cut off. When $i_{d1}$ is zero, the switching device $S_1$ is conducted, but when the conducting time $T_{on1}$ is terminated, the switching device $S_1$ is cut off. The conducting time $T_{on1}$ is determined by the parameter of the controller. Similarly, the line current $i_{d2}$ of the lower-half bridge is employed to control the switching device $S_2$ being conducted and cut off. When $i_{d2}$ is zero, the switching device $S_2$ is conducted, but when the conducting time $T_{on2}$ is terminated, the switching device $S_2$ is cut off. Generally, the response in the controller of the PFC converter is quite slow, and thus the conducting time $T_{on}$ of the inner power device is regarded as a constant value in a duty cycle. In addition, $T_{on1}$, $T_{on2}$ are equal to each other.

The three-phase voltage is assumed:

$V_a(\theta) = \sqrt{2} V_{rms} \sin \theta$ $V_b(\theta) = \sqrt{2} V_{rms} \sin (\theta - 120°)$ $V_c(\theta) = \sqrt{2} V_{rms} \sin (\theta + 120°)$ According to the working mode of critical current continuity, the working modes of the PFC inverter are divided into 12 phases.

In the following, we choose $\theta = 0 \sim \pi/6$ as an example to illustrate the working principle for the PFC converter, in which: $V_c(\theta) > V_a(\theta) > 0$, $V_b(\theta) < 0$, and $i_{d1} = i_a + i_c$, $i_{d2} = -i_b$.

Figure 7:
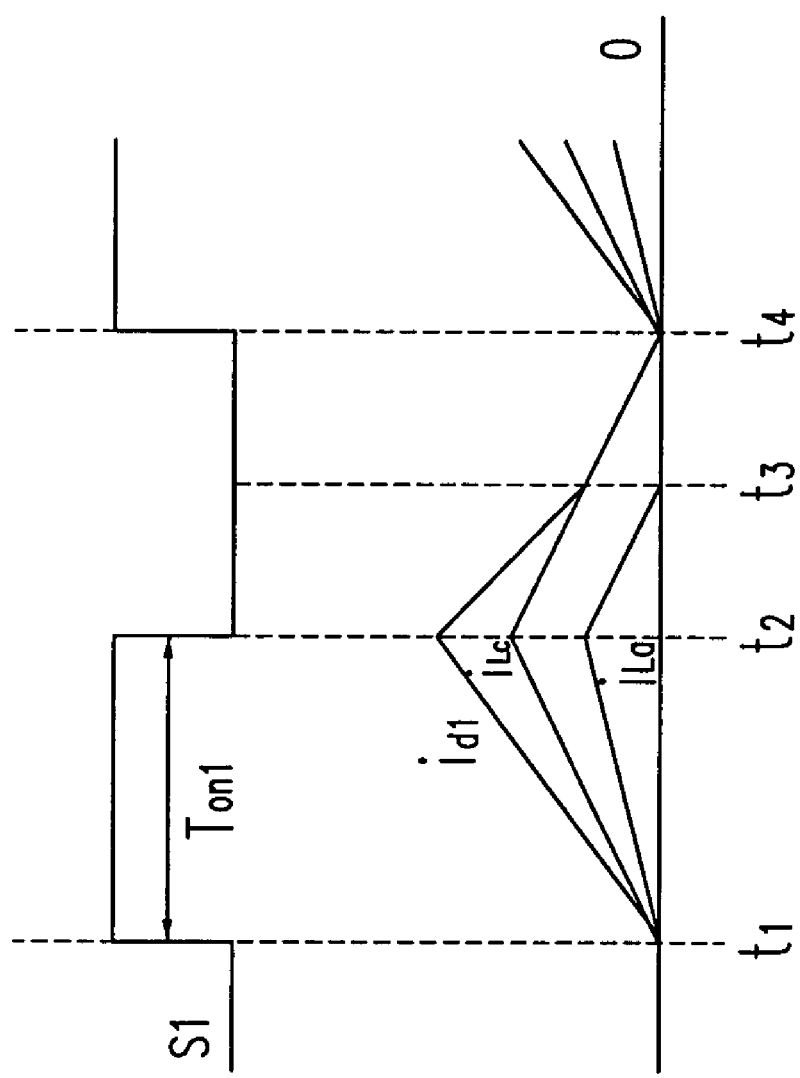
FIG. 7 is a schematic view showing the working principle of the AC/DC converter according to a preferred embodiment of the present invention.

Please refer to FIG. 7, which is a schematic view showing the working principle of the AC/DC converter according to a preferred embodiment of the present invention. The working principle of the upper-half bridge is stated below. At $t_1$, the inductance currents $i_{La}$, $i_{Lc}$ of the inductors $L_a$, $L_c$ are zero, the switching element $S_1$ is conducted. Further, the inductors $L_a$, $L_c$ are respectively driven by the voltages $V_a$, $V_c$ to store energy so that the inductance currents $i_{La}$, $i_{Lc}$ increase linearly. Till $t_2$, the conducting time of switching element $S_1$ is equal to the conducting time $T_{on1}$, and the conducting time is determined by the parameters of the controller. At $t_2$, the switching element $S_1$ is cutoff. The stored inductance energy starts to be released under the driving force of the voltages $V_{o1} - V_a$, $V_{o1} - V_c$ so that the inductance currents $i_{La}$, $i_{Lc}$ are decreased linearly. Since $V_{o1} - V_a$ is higher than $V_{o1} - V_c$, the stored energy of inductor $L_c$ starts to be released rapidly. At $t_3$, the inductance current $i_{La}$ is zero, while the inductance current $i_{Lc}$ is not zero. The inductance current $i_{Lc}$ keeps decreased and the stored energy is gradually released. At $t_4$, the inductance current $i_{Lc}$ is zero, and the stored energy is totally released. The switching element $S_1$ is conducted again, and a new switching cycle begins. In addition, from FIG. 7 it is clear that during $t_3 \sim t_4$ the inductance current $i_{Lc}$ keeps above zero. That is to say, during the period $\theta = 0 \sim \pi/6$ of every switching cycle, the inductance current $i_{La}$ works by a current intermittent model and the inductance current $i_{Lc}$ works in a current critical continuity model. Apparently, during the period $\theta = 0 \sim \pi/6$, the input current of the C phase correspondingly follow the input voltage waveform of the C phase. The description in the above relates to the working waveform of the switching cycle at certain moment during the period $\theta = 0 \sim \pi/6$.

The working principle of the lower-half bridge (not shown) is stated below. At $t_1$, the bus current $i_{d2}$ is zero, the switching element $S_2$ is conducted. Further, the inductors $L_b$ is driven by the voltages $V_b$ to store energy so that the inductance current $i_{Lb}$ is increased linearly. At $t_2$, the conducting time of switching element $S_2$ is equal to the conducting time $T_{on2}$, and the switching element $S_2$ is cutoff. The stored inductance energy starts to be released under the driving force of the voltage $V_{o2} - V_b$ so that the inductance current $i_{Lb}$ is decreased linearly. At $t_3$, the inductance current $i_{Lb}$ is decreased to zero, the switching element $S_2$ is conducted again, and a new switching cycle begins. From the above, during the period $\theta = 0 \sim \pi/6$ the input current of the B phase correspondingly follows the input voltage waveform of the B phase. Similarly, the other 11 phases are analyzed according to the phase 1, and the details are no long stated.

Figure 8:
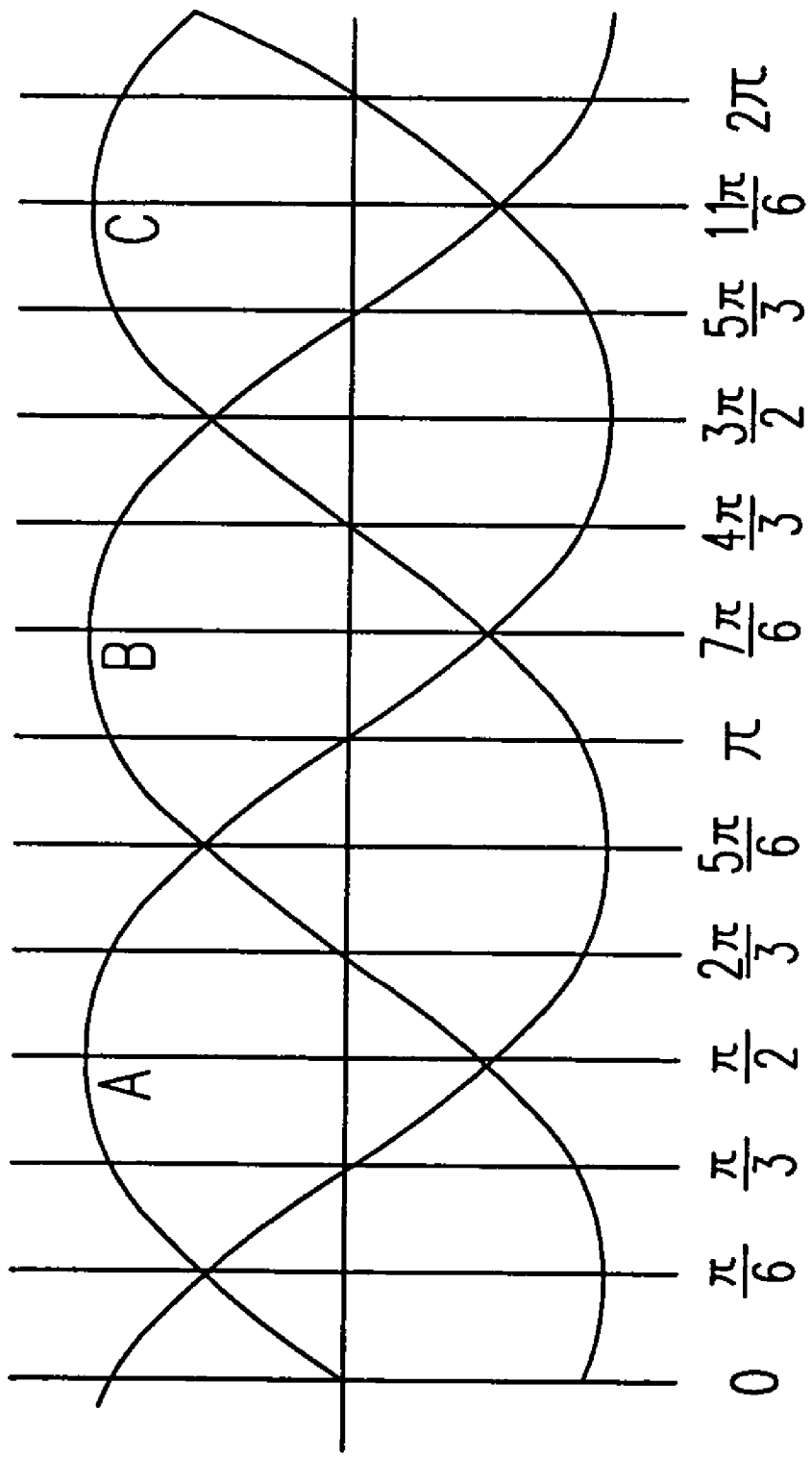
FIG. 8 is a schematic view showing the voltage waveform of the three-phase input according to a preferred embodiment of the present invention.

According to this strategy, when analyzing the working waveform thoroughly during the period $\theta = 0 \sim \pi/6$, we know that the current flow through the inductor $L_a$ has the following features:

Please refer to FIG. 8, which is a schematic view showing the voltage waveform of the three-phase input according to a preferred embodiment of the present invention. During the positive half cycle $\pi/6 \sim 5\pi/6$, the voltage width of the A phase is higher than that of B, C phases, while during the negative half cycle $7\pi/6 \sim 11\pi/6$, the voltage width of the A phase is also higher than that of B, C phases. The A phase works by a critical current continuity model, and thus the cutoff time of the switching element $S_1$, ($S_2$) is only determined by the input phase voltage $V_a$. In such a way, the average current of the current $i_a$ in every switching cycle is determined merely by the phase voltage $V_a$ thereof, and the phase voltages $V_b$, $V_c$ don't have any effect on the current $i_a$. Therefore, the input current of A phase will be a sine current which correspondingly follows the phase voltage $V_a$.

During the periods $0 \sim \pi/6$ ($\pi \sim 7\pi/6$) and $5\pi/6 \sim \pi(11\pi/6 \sim 2\pi)$, the switching element $S_1$ ($S_2$) is no longer determined by the input phase voltage $V_a$, but respectively determined by the phase voltages $V_b$, $V_c$. The current $i_a$ works by a current intermittent model, and therefore the average current in every switching cycle will not follow the phase voltage thereof, but follow the other phase voltages. In the two periods, the input current of A phase has distortion of certain extent.

Figure 9:
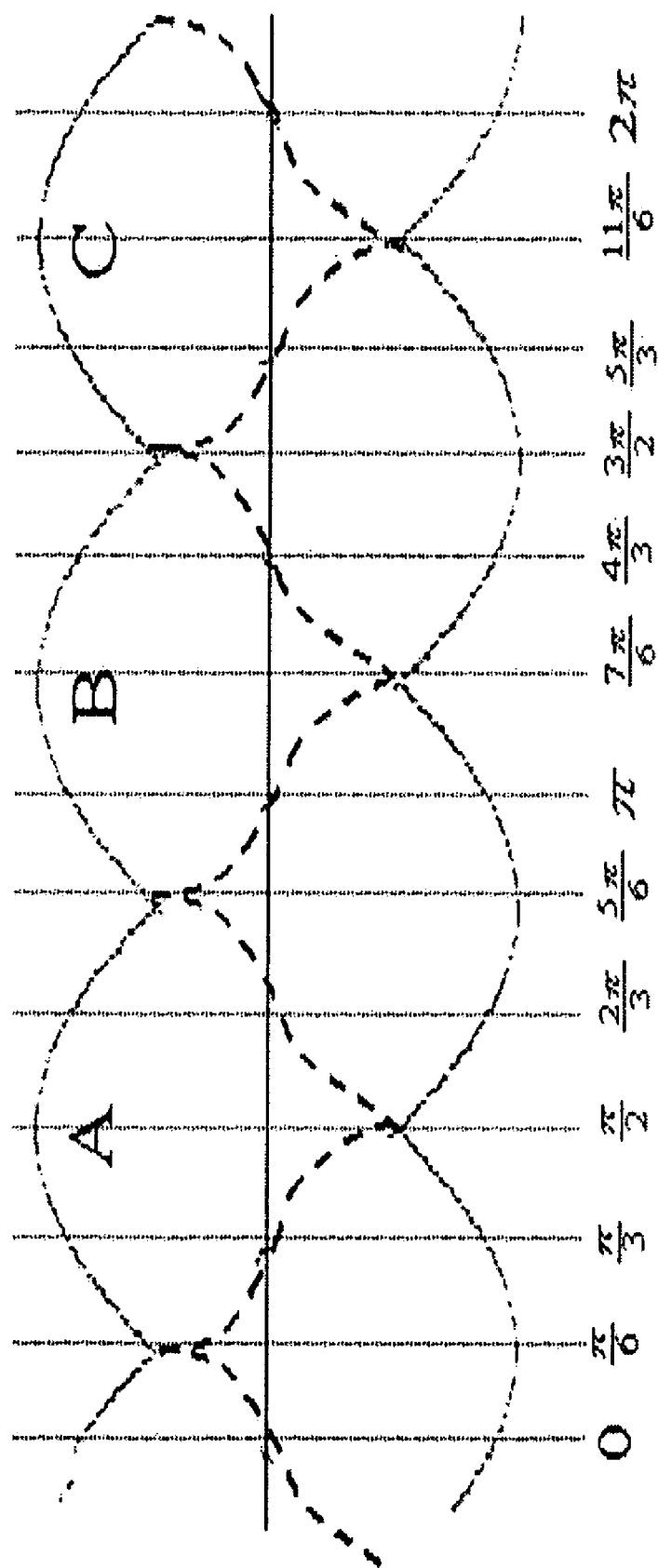
FIG. 9 is a schematic view showing the current waveform of three-phase input according to a preferred embodiment of the present invention.

According to the above analysis, most of the time the input current of every phase fully follows the phase voltage thereof and is an exact sine wave. Only for small part of time, the input current has certain extent of distortion. Therefore, the present invention employs the control strategy of the current critical continuity. Please refer to FIG. 9, which is a schematic view showing the current waveform of the three-phase input with the duty cycle according to a preferred embodiment of the present invention. From the waveform of the input current shown in FIG. 9, the topological circuit shown in FIG. 4a will have a good function of power factor correction.

Figure 10:
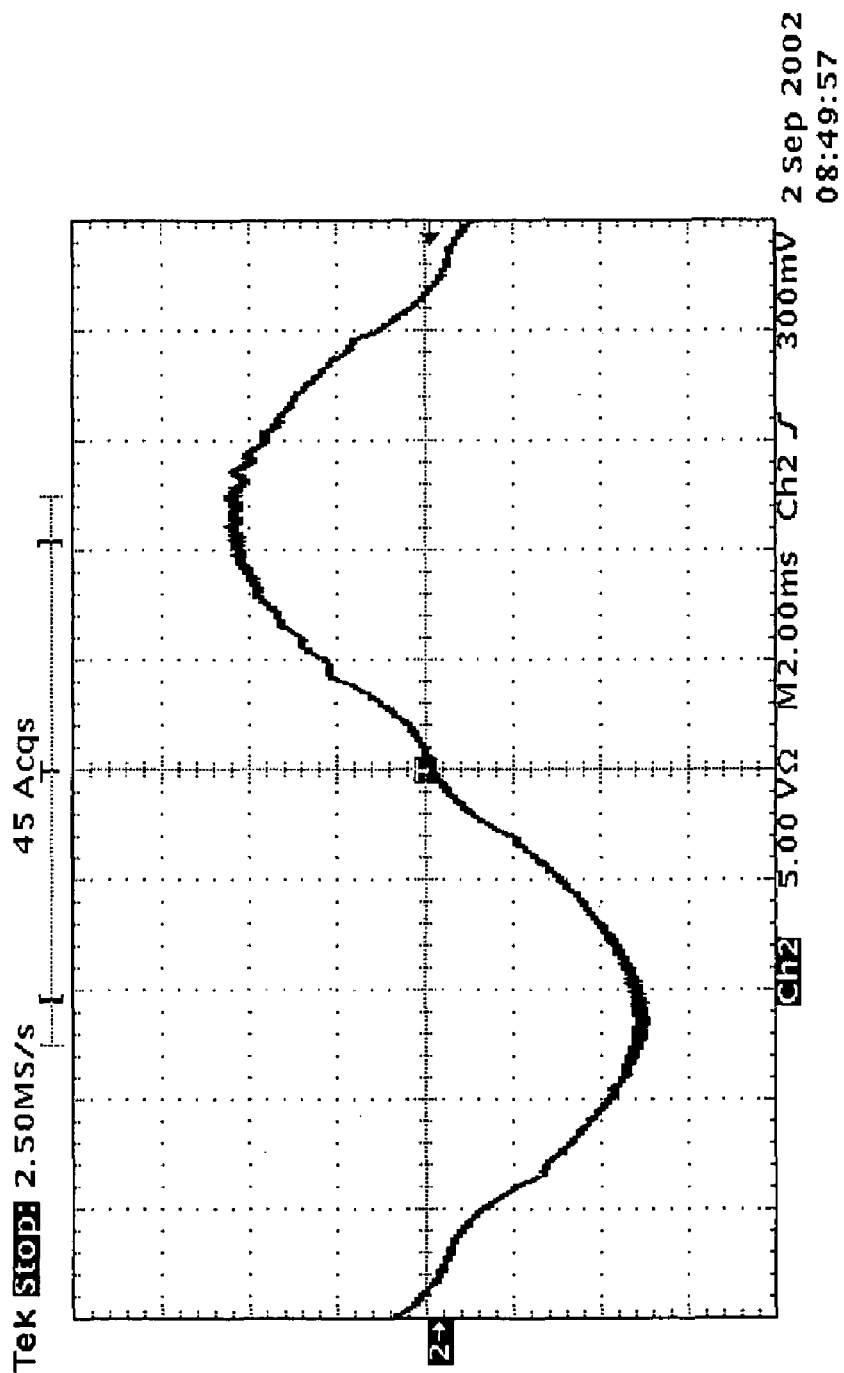
FIG. 10 is a current waveform diagram showing one of the three phases according to a preferred embodiment of the present invention.

In the experiment, when the input phase voltage is 220 volts, the output voltage is 800 volts, the normal rated power is 5 KW, the total harmonic distortion rate of the input current is about 7%, which can meet all kinds of current harmonic requirements for the electric devices in different countries. FIG. 10 shows the experimental waveform of the input current of one phase under the above conditions.

Figure 1:
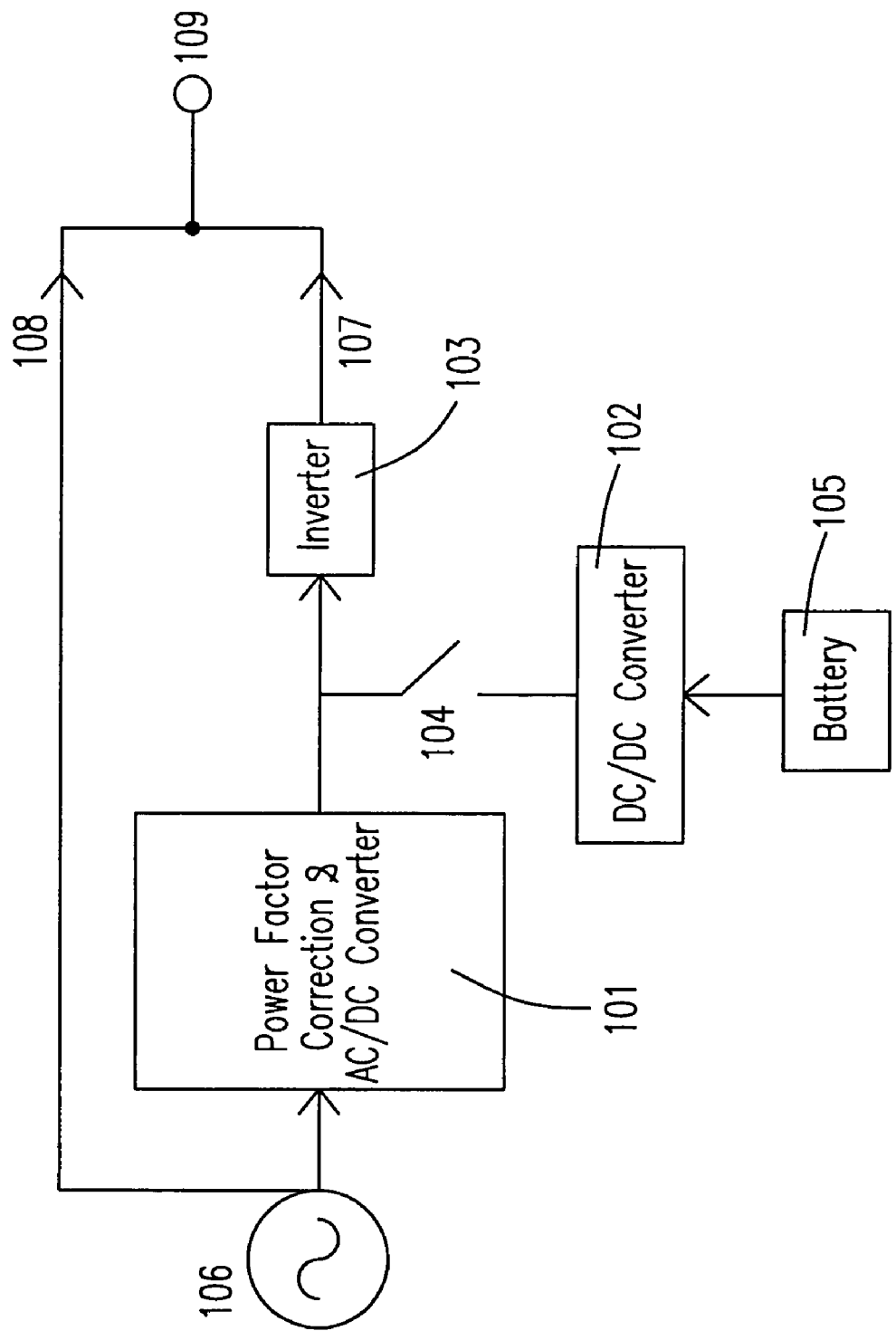
FIG. 1 is a block diagram showing an on-line uninterrupted power supply system for three-phase input according to the prior art.
Figure 2:
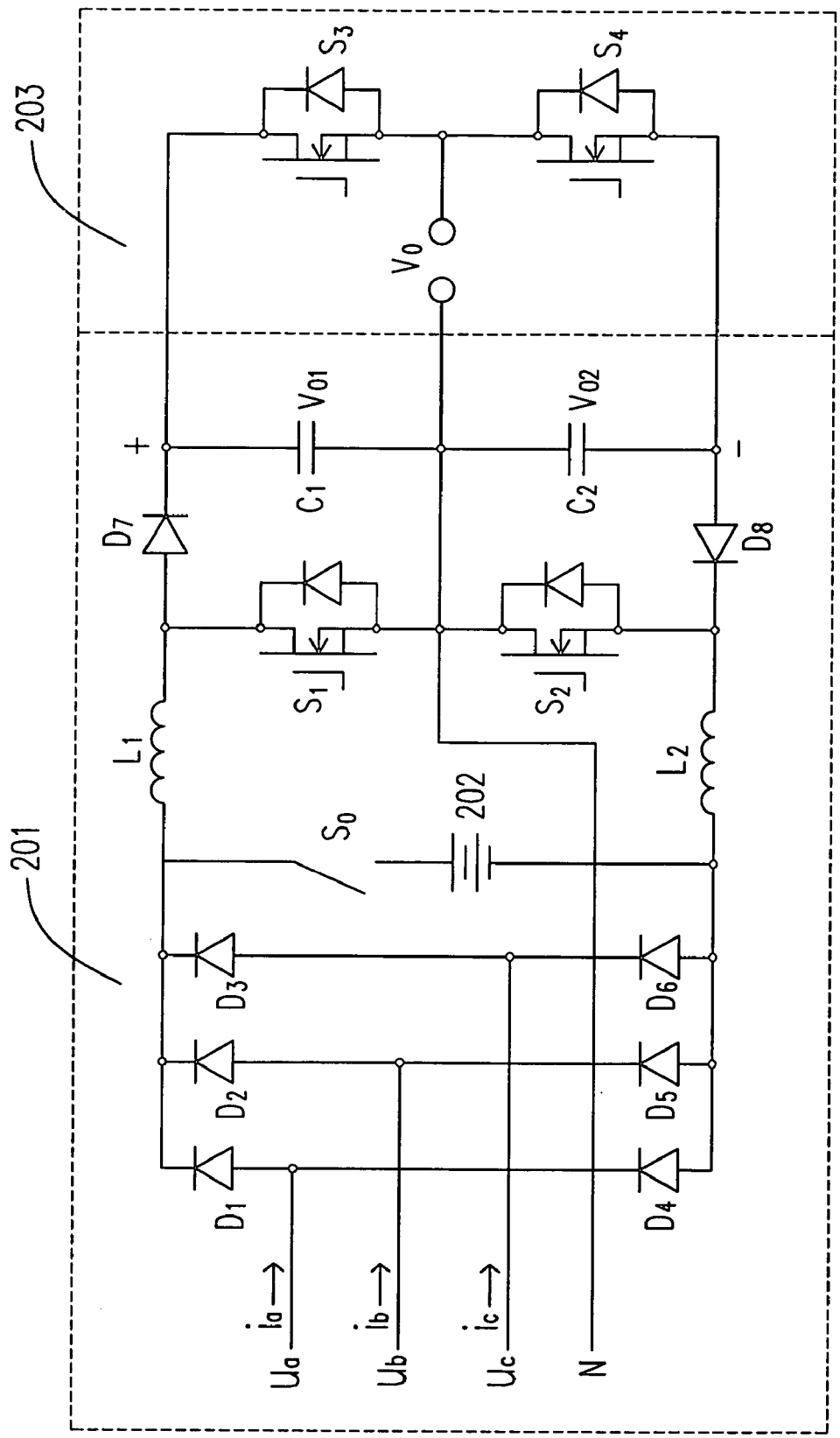
FIG. 2 is a topological circuit diagram of an uninterrupted power supply system for three-phase input and single-phase output according to the prior art.
Figure 3:
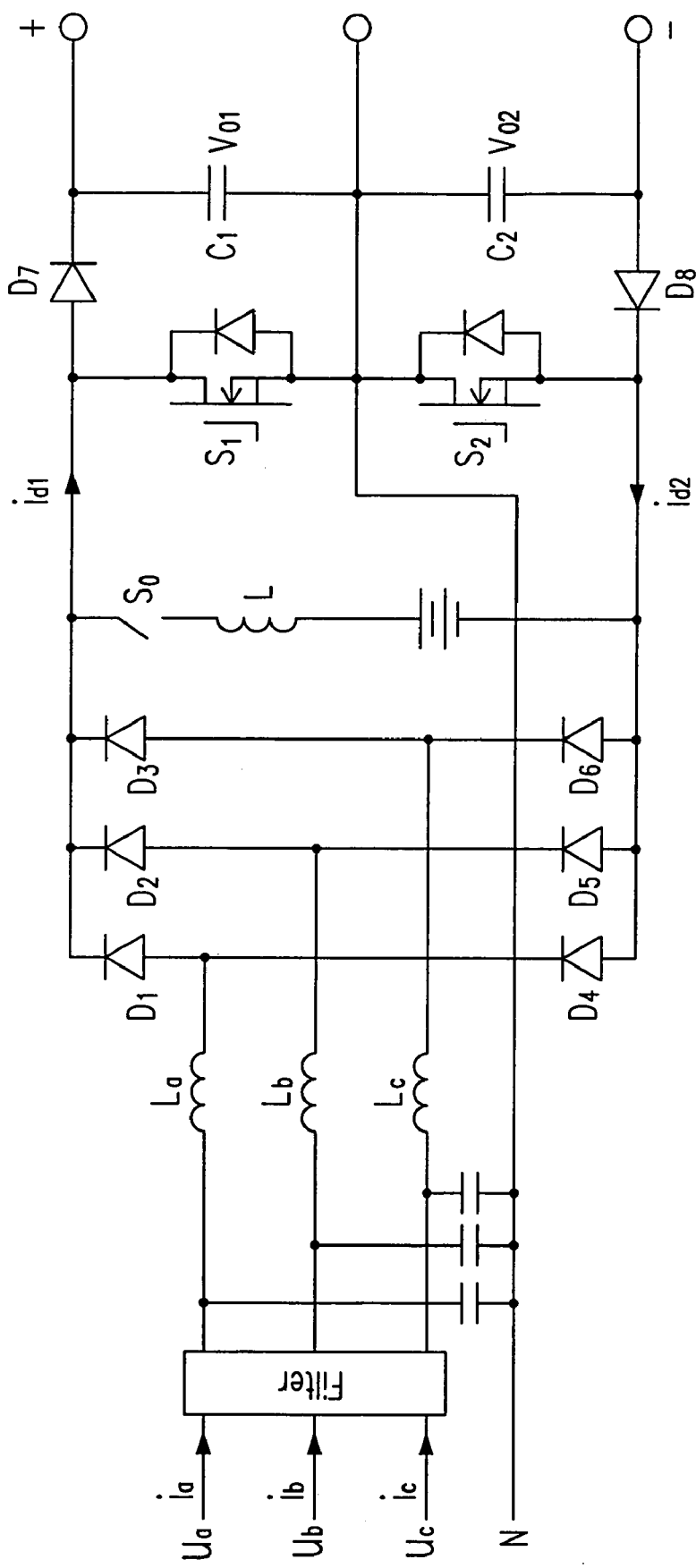
FIG. 3 is a diagram showing a power converter circuit according to a preferred embodiment of the present invention.

Please refer to FIG. 5, which is a diagram showing an DC/DC converter circuit simplified from FIG. 3. The DC/DC converter includes battery, inductor L, switching elements $S_1$, $S_2$, fast recovery diodes $D_1$, $D_2$, capacitors $C_1$, $C_2$, and etc. Apparently, this kind of DC/DC converter is the typical three-level Boost converter, and its working principle is described as follows.

Based on whether the input voltage is higher or lower than the half output voltage, the converter can be operated at two different regions. Moreover, $i_L$ is the current of the inductor L. $V_{O1}$, $V_{O2}$ respectively represent the voltages on the capacitors $C_1$, $C_2$. Generally, when analyzing the converter, we can assume $V_{O1}=V_{O2}$, and define the output voltage $V_O=V_{O1}+V_{O2}$.

Figure 11:
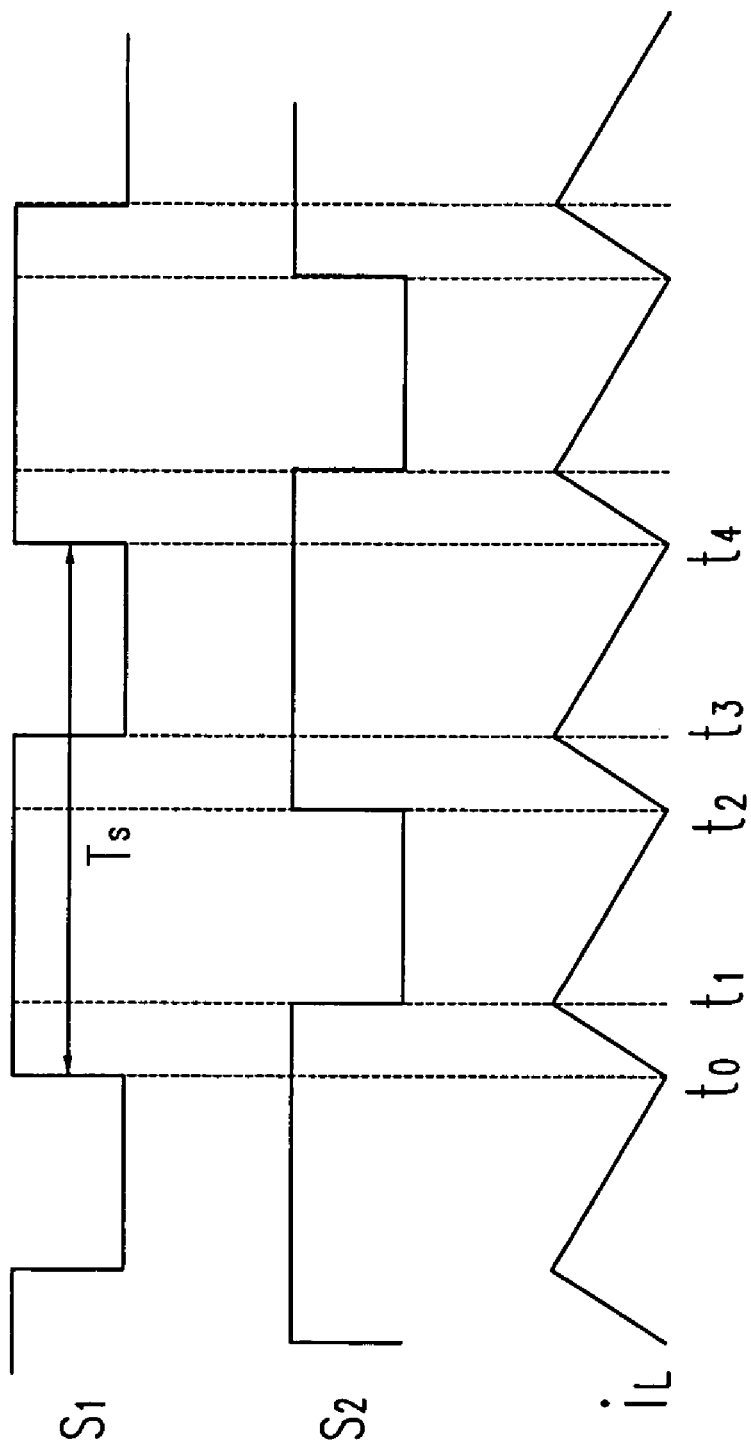
FIG. 11 is a diagram illustrating the waveforms of the voltage and current of the DC/DC converter according to a preferred embodiment of the present invention.

At region 1 ($V_{in}<V_o/2$): Please refer FIG. 11, which is a diagram illustrating the waveforms of the voltage and current of the DC/DC converter according to a preferred embodiment of the present invention. At $t_0$, it is the start of a switching cycle. At the moment, since the switching device $S_1$ is turned on, the two power switches in the main circuit are under the conducting state. Similar to the conventional Boost converter, the inductor L is driven by the input voltage $V_{in}$ to store the energy. At $t_1$, the switching device $S_2$ is cut off, and then the inductance current $i_L$ flows through the lower output capacitor $C_2$ and the diode $D_8$. At the moment, the electric releasing voltage employed on the inductor is $V_{O2}-V_{in}$. At $t_2$, $t_0+T_s/2$, the switching device $S_2$ is conducted, and the inductor L is driven again by the input voltage $V_{in}$ to store the energy. At $t_3$, the switching device $S_1$ is cut off, and then the inductance current $i_L$ flows through the diode $D_7$, the capacitor $C_1$, and the switching device $S_2$. The inductance current $i_L$ is driven again by the electric releasing voltage $V_{O2}-V_{in}$ to release electric energy. In every switching cycle, the capacitors $C_1$, $C_2$ are respectively charged by the inductor L so that the voltages on the capacitors $C_1$, $C_2$ is easy to control if we could appropriately control the periods of $t_1$ and $t_3$.

Figure 12:
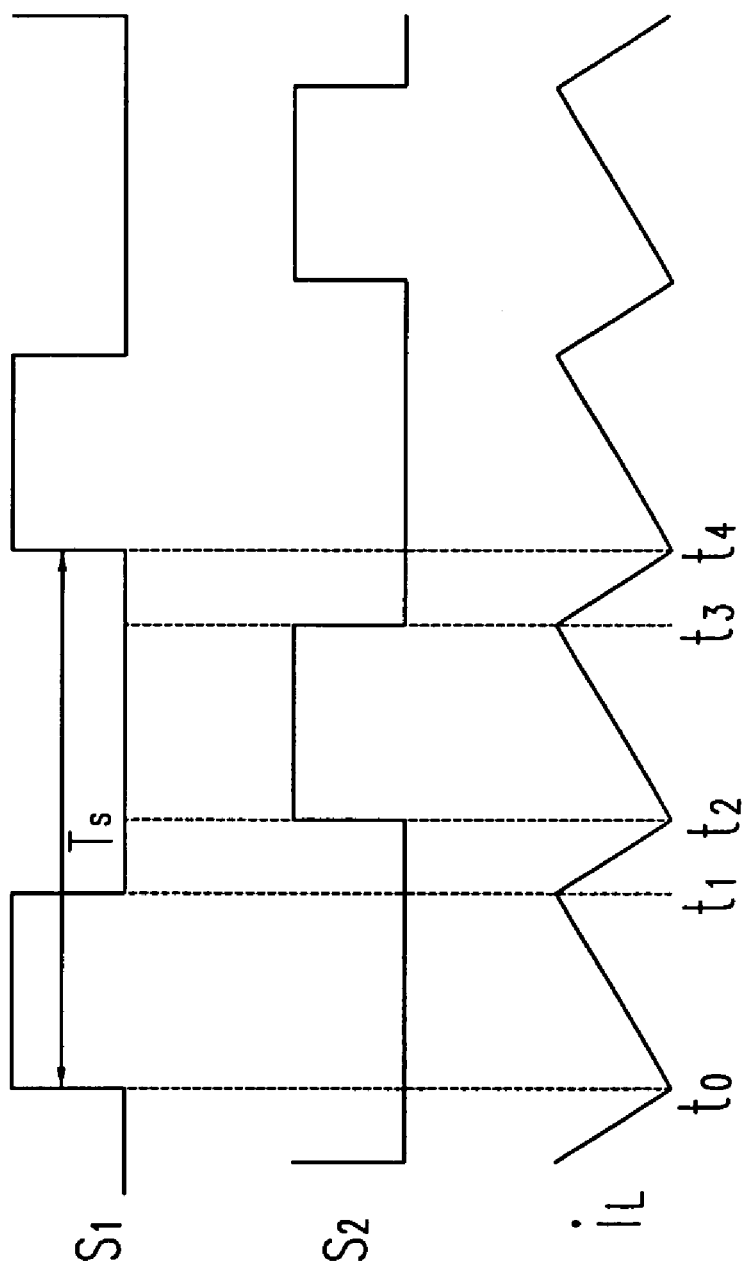
FIG. 12 is a diagram illustrating the waveforms of voltage and current of the DC/DC converter according to a preferred embodiment of the present invention.

At region 2 ($V_{in}>V_o/2$): Please refer to FIG. 12, which is a diagram illustrating the waveforms of voltage and current of the DC/DC converter according to a preferred embodiment of the present invention. At $t_0$, it is the start of a switching cycle. At the moment, since the switching device $S_1$ is turned on and the switching device $S_2$ is kept cutoff, the inductance current $i_L$ flows through the switching device $S_1$, the capacitor $C_2$, and the diode $D_8$. Also, the inductance current $i_L$ is formed under the driving force of the voltage $V_{in}-V_{O2}$. At $t_1$, the switching device $S_1$ is cut off, and then the inductance current $i_L$ flows through the diodes $D_7$, $D_8$, and the capacitors $C_1$, $C_2$. Under the driving force of voltage $V_{in}-V_{O2}$, the inductance current $i_L$ will be decreased. In the next half cycle, the switching device $S_2$ will function by repeating the above working principle.

From the working mechanism described above, the working frequency of the inductance current is double of the working frequency of the switching device, and therefore the size of the inductor can be minimized.

The working principle for the AC/DC and DC/DC converter has been clearly described. In the following we will state how the integrated converter shown in FIG. 3 achieves the switching between the AC/DC and the DC/DC working mode. For convenience, we first assume the three-phase AC power supply has been electricity-drop. At the moment, the integrated converter needs to be switched from the AC/DC working mode to the DC/DC working mode. Meanwhile, a signal is added to the gate on the silicon-controlled rectifier $S_0$ so as to make it conducted. At the same time, the impulse signal produced by the PFC controller is blocked. Therefore, only the impulse produced by the DC/DC controller has effects on the switching devices $S_1$, $S_2$, which makes the integrated converter of the present invention function under a DC/DC converting model.

When the three-phase AC power is restored to normal, the integrated converter of the present invention is switched from the DC/DC working mode to the AC/DC working mode. Under this state, in order to reliably cut off the silicon-controlled rectifier, not only should the control signal added on the silicon-controlled rectifier $S_0$ be deleted, but also the impulse signals produced by the PFC controller and DC/DC controller should be blocked for a while at the same time. In other words, the switching devices $S_1$, $S_2$ are cut off for a while simultaneously. Also, during this period the stored energy in the inductor L is totally released under the working force of the voltage $V_{in}-V_O$ so that the current on the inductor L is back to zero and the silicon-controlled rectifier $S_0$ is reliably cut off. At the moment, the main circuit for the integrated circuit is converted to the topological circuit shown in FIG. 4a. When the impulse signal produced by the PFC controller has direct effects on the switching devices $S_1$, $S_2$, the integrated circuit of the present invention is operated under the AC/DC converting model again.

When the integrated converter of the present invention stays in a normal working state and the monitor system detects that the three-phase AC power supply is normal, the silicon-controlled rectifier will be cut off. At the moment, the pulse width modulation (PWM) signal produced by the DC/DC controller is blocked, and the integrated converter is operated as an AC/DC converter. Meanwhile, the converter is operated under the working mode of critical electric continuity by the functioning of the PFC control circuit to achieve the PFC correction function. When the three-phase AC power is electricity-drop or breakdown, the silicon-controlled rectifier is conducted, and the DC/DC converter works for converting the battery voltage into direct current of high voltage so as to serve as the front input of the inverter. To sum up, the monitor system makes a guarantee that the AC/DC converter and the DC/DC converter will not work at the same time. According to the practical situations the converter can only work by one of the two models.

The integrated converter has the following advantages: (1) The two working modes of AC/DC converter and DC/DC converter are integrated. (2) The main circuit and the controlling circuit are simple. (3) Since the main circuit is divided into two parts, the voltage stress of the switching device is not high. Therefore, a MOSFET, which could bear 500 volts, can be applied to the present invention. (4) When the AC/DC converter works, the voltage stress on the input diode is lower, and thus there exists no phase recovery problem. (5) The total harmonic distortion (THD) of the input current is much lower, the total harmonic content can meet the harmonic requirements for the electric devices in different countries. (6) The efficiency of the integrated converter is high. (7) Due to the existence of the neutral line, the integrated converter is particularly suitable for the UPS system of the inverter with the half-bridge structure. (8) When the DC/DC converter works, the three-level power technique can be applied to the present invention, and the size of the inductor L is quite smaller than the conventional size.

Figure 13:
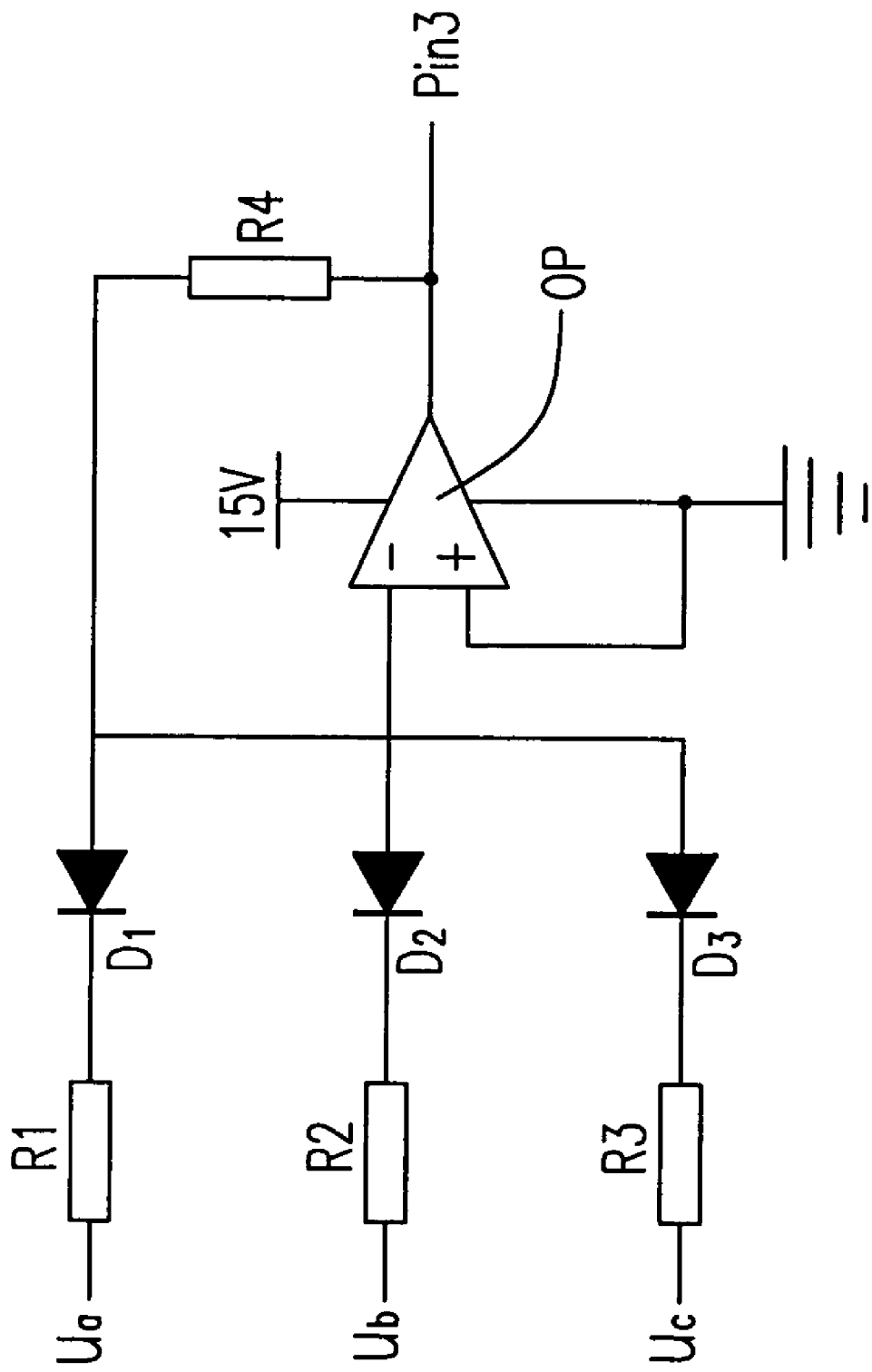
FIG. 13 is a schematic diagram showing a sine sample circuit according to a preferred embodiment of the present invention.

Moreover, during the research of the integrated converter, a simple and practical sine sample circuit is also disclosed. The circuit can sample the six-channel crossover sine waveform needed in the input of the three-phase electrified wire fence, and the circuit can be ingeniously applied to the integrated converter. The sine waveform sample circuit is shown in FIG. 13. In FIG. 13, $u_a$, $u_b$, and $u_c$ respectively represent the three phase powers of the electrified wire fence. The chip of the operating amplifier (OP) is connected to the ground, and the output end of the operating amplifier is connected to the controller of the AC/DC converter. Its working principle is described as follows.

When the AC/DC converter of the present invention works, it employs the critical current continuity model and has excellent function of power factor correction. In the critical current continuity model, a controlling chip STL6561, and etc. are employed. The chip is designed for single-phase input and low power supply. Therefore, when the input is the three-phase electrified wire fence, the sine waveform sample circuit is needed. Please refer to FIG. 13. The sample circuit includes the operational amplifier. The negative input end of the operational amplifier individually and electrically connected to the serial circuit of the three sets of resistors R1, R2, R3 and diodes D1, D2, D3. The resistor R4 is electrically connected between the negative input end and output end Pin3 of the operational amplifier. The working principles of the two states as follows. (For convenient, the lower-half bridge is illustrated only)

In state 1, when θ=0–π/6, and $i_{d2}=i_b$, only the current of one phase power $u_b$ flows through the bus of the lower half bridge. At this stage, the peak current $i_{d1}$ on the bus follows the voltage waveform on phase power $u_b$. Furthermore, on the bus of the upper half bridge, the peak current $i_{d1}$ is equal to the current $i_a$ plus the current $i_c$ ($i_{d1}=i_a+i_c$). The peak current $i_{d1}$ also follows the voltage waveform of the voltage $V_a+V_c$. Since $V_a+V_b+V_c=0$, the peak current $i_{d1}$ also follows the voltage waveform of the voltage $V_b$.

In state 2, when θ=7π/6–π, and $i_{d2}=i_a+i_c$, the currents of the two phase powers $V_a$, $V_c$ flow through the bus of the lower half bridge. At this stage, the peak current $i_{d2}$ follows the voltage waveform of the voltage $V_a+V_c$. Furthermore, on the bus of the upper half bridge, the peak current $i_{d1}=-i_b$. The peak current $i_{d1}$ follows the voltage waveform of the voltage $V_b$. Since $V_a+V_b+V_c=0$, The peak current $i_{d2}$ also follows the voltage waveform of the voltage $V_b$. Based on the above analysis, the current $I_d^{ref}(\theta)$ on the bus can be formulated as follow:

$$I_d^{ref}(\theta) = \begin{cases} k \times |V_b(\theta)| & 0 \le \theta \le \frac{\pi}{6} \\ k \times |V_a(\theta)| & \pi \le \theta \le \frac{7\pi}{6} \end{cases}$$

In the formula, k is a constant. Usually, it is expressed by the formula below: $I_d^{ref}(\theta)=k\times\max(|V_a(\theta)|, |V_b(\theta)|, |V_c(\theta)|)$, wherein the maximum item is selected from the ($|V_a(\theta)|$, $|V_b(\theta)|$, $|V_c(\theta)|$).

The sine wave sample circuit is suitable for the PFC inverter of three-phase four-wire system. The circuit can be applied to not only the critical electric model control, but also the electric intermittent model control and the electric continuity model control.

To sum up, the present invention provides a converter integrating AC/DC and DC/DC power converters. When the three-phase AC power supply works, the integrated converter can achieve the function of AC/DC converter through the controlling switch $S_0$. The harmonics of the input current is lower so that it can meet the harmonic requirements for input current of the electric devices in different countries. When the three-phase AC power supply fails, the integrated converter can achieve the function of DC/DC converter for converting the battery voltage into direct current of high voltage so as to serve as the front input of the inverter. In addition, the integrated converter is suitable for the UPS system, and the integrated converter has the following advantages: (1) The AC/DC converter and DC/DC converter are integrated. (2) The AC/DC converter and DC/DC converter share same switching devices, and thus the integrated converter has the features of high power density and low cost. (3) When the integrated converter works under the AC/DC converting model, the integrated converter has the PFC function of three-phase AC power supply. The total harmonic distortion of the input current is much lower, so the total harmonic content can meet the harmonic requirements for the electric devices in different countries. When the integrated converter works under the DC/DC converter model, the three-level power technique is employed, and the size of the inductor L is quite smaller than the conventional size.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. An integrated converter, comprising:
    a set of first inductors having an end electrically connected to an AC power supply;
    an AC/DC converting device electrically connected to the other end of said set of first inductors for converting an alternating current into a first direct current;
    a controlling switch electrically connected in series with an electric energy storage device and a second inductor; and
    a DC/DC converting device electrically connected to said AC/DC converting device for converting said first direct current into a second direct current, wherein while said AC power supply is abnormal, said controlling switch is turned on and said integrated converter is switched from an AC/DC working mode to a DC/DC working mode, and while said AC power supply is restored to normal, said controlling switch is turned off and said integrated converter is switched from said DC/DC working mode to said AC/DC working mode.

2. The integrated converter according to claim 1, wherein said integrated converter further comprises a filter electrically connected between said set of first inductors and said AC power supply.

3. The integrated converter according to claim 1, wherein said abnormal state of said AC power supply is one of an electricity-drop state and a breakdown state.

4. The integrated converter according to claim 1, wherein said AC power supply is a three-phase AC power supply.

5. The integrated converter according to claim 1, wherein said AC/DC converting device is a bridge rectifier.

6. The integrated converter according to claim 1, wherein said electric energy storage device is a battery.

7. The integrated converter according to claim 1, wherein said integrated converter includes a DC/DC converter and an AC/DC converter.

8. The integrated converter according to claim 7, wherein said DC/DC converter includes said DC/DC converting device and said DC/DC converting device comprises:
    an upper half-bridge circuit comprising a first switching device, a first diode, and a first capacitor; and
    a lower half-bridge circuit comprising a second switching device, a second diode, and a second capacitor, wherein said first switching device is electrically connected in series with said second switching device; said first capacitor is electrically connected in series with said second capacitor; a connection nod between said first switching device and said second switching device is connected to a connection nod between said first capacitor and said second capacitor and further connected to a neutral line of said AC power supply, and said upper half-bridge circuit and said lower half-bridge circuit are electrically connected in parallel to a serial circuit comprising said controlling switch, said electric energy storage device, and said second inductor for converting an electric energy of said electric energy storage device into a first direct current, and further converting said first direct current into a second direct current via said upper half-bridge circuit and said lower half-bridge circuit.

9. The integrated converter according to claim 7, wherein said AC/DC converter comprises said set of first inductors, said AC/DC converting device, and said DC/DC converting device.

10. The integrated converter according to claim 1, wherein said integrated converter further includes a sample circuit, and said sample circuit comprises:

an operational amplifier having a negative input end individually and electrically connected to a serial circuit comprising at least one set of a first resistor and a diode and a positive input end electrically connected to a ground, wherein an output end of said first resistor is electrically connected to said AC power supply for sampling a sine wave of said AC power supply; and a second resistor electrically connected between said negative input end and output end of said operational amplifier.

11. An integrated converter, comprising:

a set of first inductors having an end electrically connected to an AC power supply;

an AC/DC converting device electrically connected to the other end of said set of first inductors;

a controlling switch electrically connected in series with an electric energy storage device and a second inductor; and a DC/DC converting device electrically connected to said AC/DC converting device, wherein while said AC power supply is abnormal, said controlling switch is turned on and said integrated converter is switched to a first working circuit comprising said electric energy storage device, said second inductor, and said DC/DC converting device for providing a first direct current output, and while said AC power supply is restored to normal, said controlling switch is turned off and said integrated converter is switched to a second working circuit composing said set of first inductors, said AC/DC converting device, and said DC/DC converting device for providing a second direct current output.

* * * * *

UNITED STATES PATENT AND TRADEMARK OFFICE
CERTIFICATE OF CORRECTION

PATENT NO. : 7,005,759 B2 Page 1 of 1
DATED : February 28, 2006
INVENTOR(S) : Jianping Ying et al.

It is certified that error appears in the above-identified patent and that said Letters Patent is hereby corrected as shown below:

<u>Column 7,</u>
Line 14, change "to" to -- $t_0$ --.

Signed and Sealed this

Thirteenth Day of June, 2006

JON W. DUDAS
*Director of the United States Patent and Trademark Office*